(12) United States Patent
Kellum (10) Patent No.: US 9,148,704 B1
(45) Date of Patent: Sep. 29, 2015

(54) METHOD AND APPARATUS FOR AN EXTERNAL EVENT TICKER

(71) Applicant: ARRIS Group, Inc., Suwanee, GA (US)

(72) Inventor: John M. Kellum, Seattle, WA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/083,601

(22) Filed: Nov. 19, 2013

Related U.S. Application Data (63) Continuation of application No. 10/335,536, filed on Dec. 31, 2002, now Pat. No. 8,589,971.

(51) Int. Cl.
*H04N 7/10* (2006.01)
*G06F 3/00* (2006.01)
*H04N 21/488* (2011.01)

(52) U.S. Cl.
CPC ................... *H04N 21/4886* (2013.01)

(58) Field of Classification Search
CPC .......... H04N 21/488; H04N 21/4886

USPC ...................................... 725/32, 50
See application file for complete search history.

(56) References Cited

U.S. PATENT DOCUMENTS

| | | | | |
|---|---|---|---|---|
| 6,536,041 | B1 * | 3/2003 | Knudson et al. | 725/39 |
| 2003/0070182 | A1 * | 4/2003 | Pierre et al. | 725/135 |
| 2003/0167467 | A1 * | 9/2003 | Allen et al. | 725/47 |
| 2004/0002972 | A1 * | 1/2004 | Pather et al. | 707/6 |

\* cited by examiner

*Primary Examiner* — Nasser Goodarzi
*Assistant Examiner* — Michael Hong
(74) *Attorney, Agent, or Firm* — Troy A. Van Aacken (57) ABSTRACT

An external event interactive television ticker is provided. The ticker is rendered on a display screen that also shows a video program, and presents ticker content when a pre-defined external event has occurred. The ticker remains rendered until the event ceases or until the viewer terminates the ticker display. The ticker is interactive in that the viewer can perform various interactive operations with the ticker, including interacting with the ticker to obtain additional information related to an external event item presented by the ticker or to take an action associated with the external event item.

25 Claims, 8 Drawing Sheets

METHOD AND APPARATUS FOR AN EXTERNAL EVENT TICKER

TECHNICAL FIELD

This disclosure relates generally to presentation of information on a display device, and in particular but not exclusively, relates to generating and displaying a ticker on a device based on the occurrence of selected external events.

BACKGROUND

It is relatively common to see television programs accompanied by a scrolling "ticker." The term "ticker" derives from the fact that information in the ticker scrolls sequentially across the bottom of a television screen in a manner analogous to a stock market ticker tape. However, instead of simply including stock market information, current tickers carry a wide variety of other types of information. For instance, tickers that are present on sports channels typically scroll game scores or game schedules. Tickers that are present on news channels scroll the latest headlines, weather reports, or brief news updates.

Tickers are generally encoded in the same analog or digital signal as the television signal. For instance, with Motion Pictures Experts Group (MPEG) digital encoding, the ticker information is included along with the MPEG stream. A graphics generator or other mechanism generates the ticker information at a production studio (or other location) and then combines the ticker information with the television signal. The television signal is then broadcast to viewers. Obviously, with this current implementation, viewers have no control over the content, format, layout, or other presentation aspect of the ticker on their television (including whether or not to even display the ticker), since the production studio maintains such control and since the ticker is integrated with the received television signal.

Because of the lack of viewer control over the operation of these tickers and over the content that they provide, such tickers are "non-interactive." The static and predetermined nature of these non-interactive tickers makes them unsuitable for interactive television environments. With interactive television, viewers can access interactive content and services that are generally unavailable through conventional television. The "interactive" viewing experience allows viewers to interact with content and services typically with the push of a button, in a manner not allowed by conventional television. Non-interactive tickers that push unsolicited and repetitious information or completely disappear when the viewer changes television channels or when there are changes in the television program may cause much viewer aggravation and detract from the interactive viewing experience.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of techniques to provide an external event ticker are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a ticker that displays information related to a pre-defined external event in accordance with user preferences. The external events and user preferences are defined by the user as part of the ticker set-up. Thus, as an example, if the viewer desires to be alerted in the event that a particular stock that he owns hits a certain value, the ticker can present items related to the stock price upon reaching that value. Depending on the relative importance the viewer may place on such information, the viewer may define certain priorities or display preferences that modulate whether the information is displayed at all, and if so, how it is displayed. For example, if the user places a high priority on the information, the ticker containing the information may be displayed unconditionally, i.e. without regard to whatever else the viewer may be watching, or whatever other tickers may already be displayed, and in a designated color, e.g. red for the highest priority.

An embodiment of the invention further provides the external event ticker with interactivity. Specifically, the external event information may be displayed in the ticker along with related data, including interactive data that provide the viewer with the ability to act on the external event. As an example, in the event that the stock price reached a pre-defined value at which the viewer has decided to sell, then an interactive selectable link may be provided as part of the ticker display to cause the display to switch to an internet connection and to automatically display the viewer's broker page so that he can arrange a sale of the stock in question. An embodiment of the external event ticker may be implemented in an interactive television system that provides video and interactive information to display devices, including televisions, wireless devices, and the like.

The term "ticker" as used herein is intended to generally describe a presentation of information on a display screen, such as a display screen for a television, and is not intended to be limited solely to implementations where the information is presented in a manner to exactly mimic a stock market ticker. In one embodiment, the ticker can comprise text and graphics that are scrolled or otherwise presented in a region of the display screen, along with a television image (such as an image from a live broadcast or from a recorded program). Various embodiments will be described herein in the context of "scrolling" the ticker information. It is to be appreciated that the term "scrolling" is merely illustrative of a technique to present dynamic ticker information, and that this term, in some embodiments, can encompass implementations where the ticker information is presented via screen segments of information, text segments, one-line-at-a-time, one-sentence-at-a-time, one-word-at-a-time, and the like, rather than the traditional format of one-character-at-a-time typically associated with stock market tickers. Moreover, the term "scrolling" is used generically herein to refer not only to vertical movement from bottom to top, but also movement from right to left (often referred to as "crawl") or movement in other directions.

Figure 1A:
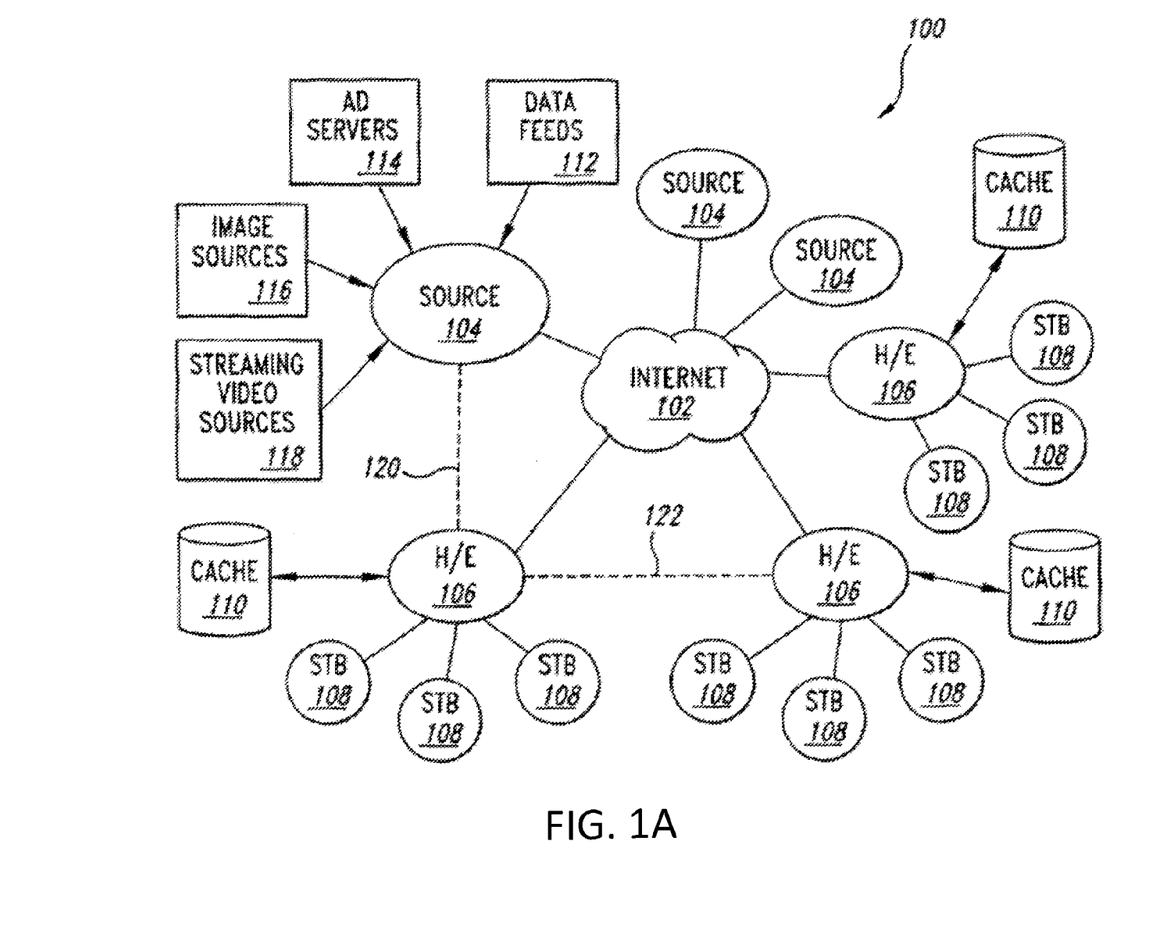
FIG. 1A is a block diagram of an example interactive video casting system that can implement an external event ticker in accordance with an embodiment of the invention.

FIG. 1A shows an example of an interactive video casting system 100 for distributing ticker content, Internet content, and television content according to an embodiment of the invention. In accordance with an embodiment of the present invention, the system 100 can be integrated with a cable television distribution system to provide interactive television tickers. The system 100 includes an Internet 102, a plurality of content sources 104, a plurality of distribution centers (depicted as the head-ends or H/Es 106), and a plurality of client terminals 108 or other devices (depicted as set top boxes). In addition, a content source 104 is depicted as receiving data from data feeds 112, advertisement servers 114, image sources 116, and streaming video sources 118. The content source 104 may also receive content from a broadcast video source. For the sake of clarity and to avoid obscuring the details of the description that follows, not all of these sources are shown in FIG. 1A for each content source 104.

The plurality of content sources 104 is coupled to the Internet 102. For example, a content source 104 may comprise a web site portal such as Go2Net.com™, or a news web site such as CNN.com™, or other types of sources. Each content source 104 may have various data feeds 112, servers 114, and sources 116/118 coupled to it.

For example, news or stock quote feeds 112 (including data for tickers) may be fed into the content source 104. Servers 114 may provide advertisements for insertion into multimedia content delivered by the content source 104 in accordance with one embodiment of the invention. Sources 116 and 118 may provide images 116, streaming video 118, and other content to the content source 104. Various other feeds, servers, and sources may also be coupled to the content source 104 of FIG. 1A.

The data feeds 112 include a plurality of different ticker data feeds that provide a variety of different topical event data that can be displayed in a ticker. For instance, the different ticker data can include sports data, weather data, national news, financial data and so forth. The sources that can provide this data can include entities such as Reuters™, The Sporting News™ (TSN), Associated Press™ (AP™), and others. In one embodiment, the ticker data comprises "raw" unformatted data (e.g., data with minimal or no formatting or graphics). The data feeds 112 may further include information provided at the client terminal 108 location in the form of data obtained from a home network 124 to which the client terminal 108 may be connected. This includes information obtained from various home appliances or home security systems that may be interfaced to the client terminal 108 through the home network 124.

The Internet 102 comprises a network of networks and is known in the art. Communications over the Internet 102 can be accomplished using standard protocols such as transmission control protocol/internet protocol (TCP/IP), hypertext transfer protocol (HTTP), file transfer protocol (FTP), or other protocols. Web sites, such as merchant web sites, can be included within or otherwise be in communication with the Internet 102. The Internet 102 is coupled to the plurality of distribution centers 106, and each distribution center 106 is in turn coupled to a plurality of client terminals 108, which may comprise a set top box, a PC, an interactive television set, or another type of communication device or display device.

In alternative or in addition to the Internet 102 being used to distribute multimedia content (including ticker data) from the content sources 104 to distribution centers 106, communications channels or networks 120 (which can include satellite delivery sources/networks, managed Internet Protocol (IP) networks supporting the delivery of voice data, referred to as voice over IP, or VoIP, or even the Public Switched Telephone Network supporting the conventional delivery of voice data) apart from the Internet 102 may couple one or more content sources 104 to one or more distribution centers 106. One example of such an alternate path for communications is illustrated by a first dashed line 120 in FIG. 1A. Alternately or additionally, peering connections may exist between distribution centers 106. One example of such peering is illustrated by a second dashed line 122 in FIG. 1A. Other communications configurations are also possible and are included within the scope of the present invention.

Caches 110 may be provided at (or otherwise coupled to) the distribution centers 106. Such caches 110 may be used to increase the performance in the delivery of multimedia content (including ticker data) to the client terminals 108. For example, larger files for video and other high bandwidth content may be stored in such caches 110, which may be closer-in-time to the client terminals 108 than to the content sources 104. In addition, reliability and guaranteed bandwidth may be provided because the Internet 102 is not in-between such caches 110 and the client terminals 108. In one embodiment, the caches 110 or other storage media in the system 100 can store ticker information, rather than or in addition to having such information buffered, cached, or otherwise stored at the client side.

In an embodiment, servers may be present in the distribution centers 106, with such servers including or being coupled to the caches 110 or other storage media. Alternatively or in addition, these servers may be located remotely from but still communicatively coupled to the distribution centers 106, via the Internet 102 or other communications channels or networks.

In accordance with one embodiment of the invention, different or multiple portals may be used to access the information provided through the interactive video casting systems of FIG. 1A, based on the type of client terminal being used by the end user. That is, for example, a television portal may be provided for an end user that uses a television set coupled to the client terminal 108 to access the information. A PC portal may be provided for an end user that uses a PC to access the information. Portals can be provided for end users that use cellular telephones, personal digital assistants (PDAs), audio devices, and the like to access the interactive video casting system 100 of FIG. 1A.

Such portals may be provided in several possible ways. In one embodiment, the client terminal (e.g., the end user's display device or audio device) can be suitably configured with an adapter that includes hardware and software. The adapter converts the television signals, the Internet or web page content, or other information provided from the interactive video casting system into a digitized format or other format that is compatible with the operational features of the particular client terminal 108.

In another embodiment, a cable service provider can deliver signals having different formats to the various client terminals 108, with the client terminals not necessarily having special adapters. Therefore, as an example, the cable service provider or other party can generate/deliver information (e.g., television programming, web page content, ticker information, voice data, and the like) having a format that is compatible for end users that receive the information via a television set. The cable service provider or other party can also generate/deliver the same information (e.g., simultaneously with the television portal on the same communication link, separately on a different communication link, on-demand independent of the television portal, and the like) using a format that is compatible with end users that receive the information via PCs, PDAs, cellular telephones, and the like. Thus, the term "interactive video casting system" is used to describe generally a system that can deliver video information and other information over any network and any network-compatible device by broadcasting, multicasting, or unicasting. An "interactive television system" is one type of or one means of access to an "interactive video casting system."

Figure 1B:
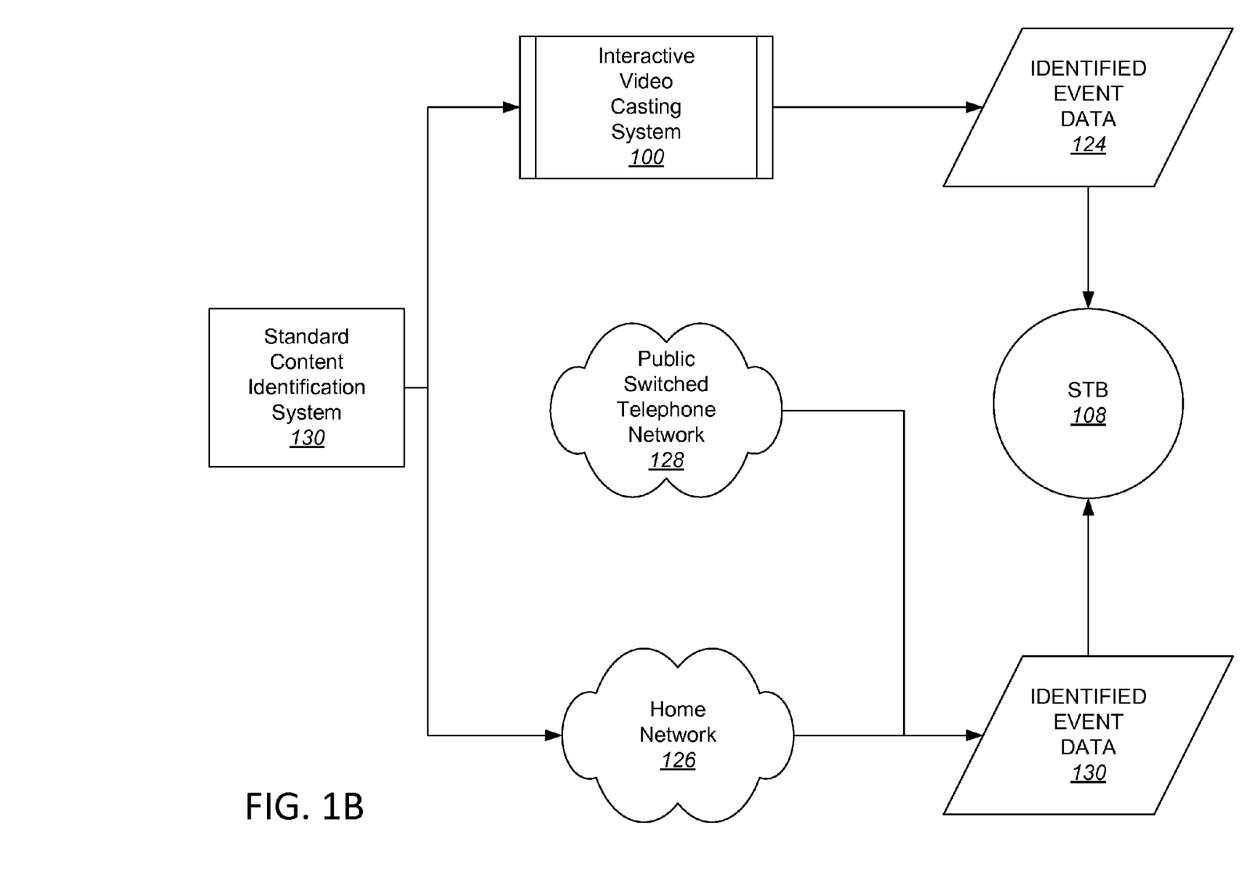
FIG. 1B is a block diagram of the example interactive video casting system of FIG. 1A in further detail in accordance with an embodiment of the invention.

FIG. 1B is a block diagram of the example interactive video casting system of FIG. 1A in further detail in accordance with an embodiment of the invention, and illustrates the various sources of data used to provide external event ticker information to client terminals 108. The interactive video casting system 100 has access to a standard content identification system 130 for identifying external events that may be of interest to client terminals 108. The standard content identification system 130 provides a standard system of identifying the subject matter of events by using a standard set of event identifiers as explained further below. The same standard content identification system 130 is accessible to the home network 126, so that a standard set of event identifiers for events detected on the home network may also be employed.

In one embodiment, another source of external events includes the telephone network 128 from which the user obtains telephone services. The telephone network 128 may be a conventional Public Switched Telephone Network, or may alternatively be an Internet Protocol Telephony Network, typically operated by the consumer's cable or satellite service provider. The external events supplied by the Interactive Video Casting System 100 are collectively referred to as identified event data 124, and the external events supplied by either the telephone network 128 or the home network 126 are collectively referred to as identified event data 128.

In one embodiment of the invention, content providers and/or broadcasters can be in partnership with a ticker provider (such as a multiple service provider or other interactive service provider) to use a standard content identification system 130. For example, the content providers can identify the subject matter of their video programs under a standard set of event identifiers (IDs). The general category of "Sports" may be identified as event ID #20, for instance. Certain sports types, teams, players, etc. may then be further identified, respectively, as ID #20A, #20A1, #20A1a, and so forth. Various event ID numbering schemes are possible. Once the subject matter has been identified as such, the broadcasters can insert triggers or other mechanisms in their broadcasts that contain these identifiers as well as the specific data values associated with the identifiers that may be used by the client terminal 108 to determine whether a pre-defined event has occurred.

The ticker provider also uses the same or similar ID numbers for its ticker content. Thus, the client terminal 108 (or the H/E 106 where appropriate) may correlate the IDs from the available ticker content with its own pre-defined information to select and scroll in a ticker items that reflect the occurrence of pre-defined external events.

In one embodiment, the ticker data, regardless of where it originated, is tagged with IDs that specifically identify its subject matter, where these IDs are from the same standard IDs used by the content providers and broadcasters in their television broadcasts. Thus, the general ticker category of "Sports" may be similarly identified as ID #20, for instance. A certain sport, team, player, and other related ticker content (if available) may then be further similarly identified, respectively, as ID #20A, #20A1, #20A1a, and so forth, so as to match the standard identification system used by the content providers, broadcasters, or home networking systems.

Figure 2:
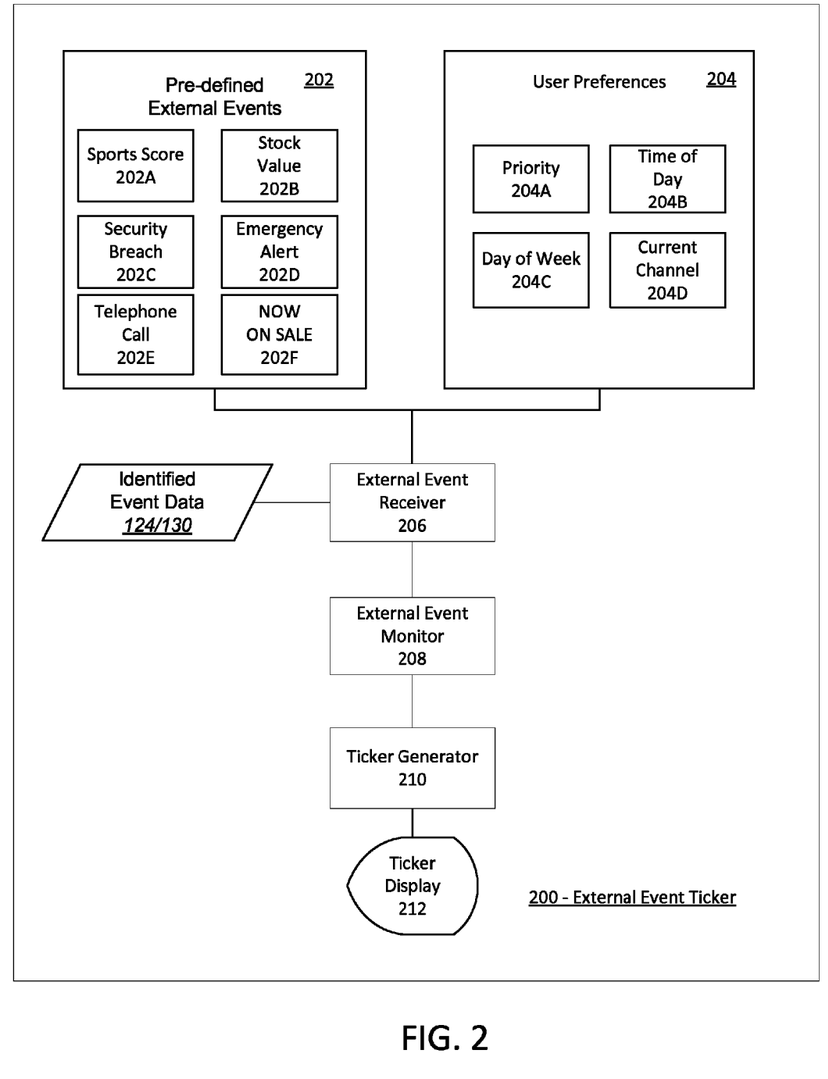
FIG. 2 is a block diagram illustrating selected components of an external event ticker that may be employed in the system of FIGS. 1A-1B to provide external event ticker displays in accordance with an embodiment of the invention.

FIG. 2 is a block diagram illustrating selected components that can be included in the interactive video casting system 100 of FIG. 1A-1B to provide data for tickers in accordance with an embodiment of the invention. In particular, FIG. 2 illustrates components of an external event ticker 200 that can be implemented in the STB client terminals 108 or the H/E 106, or distributed among both. The pre-defined external events 202 include a variety of data such as sports scores 202A, stock values 202B, security breach codes 202C, emergency alert codes 202D, telephone call information (e.g. caller identity), and commerce opportunities (e.g. ticket sales, special offers, etc.). The pre-defined events 202 further include the same or similar ID numbers associated with the ticker content. Thus, as noted earlier, the client terminal 108 (or H/E 106 where appropriate) can correlate the IDs from the available ticker content with its own pre-defined external events 202 to select and scroll in a ticker those items that reflect the occurrence of pre-defined external events. Table 1 below lists some examples of other types of external events that may be included as pre-defined external events 202. It is understood that the depicted external events 202 and those listed in Table 1 are just some examples of the types of event data that the viewer may predefine, and is not to be construed as limiting the scope of the claims that follow.

TABLE 1

| Example External Events |
|---|
| time of day |
| triggers |
| news in close caption, vbi, oob, etc. |
| purchase opportunities |
| completion of download |
| completion of upload |
| completion of upgrade |
| notification of new service |
| incoming email |
| incoming instant message |
| service alert |
| webcam event |

TABLE 1-continued

Example External Events new content available notification
incoming phone call
home or network security breach
change of remote master user
over account credit limit
running out of pvr storage notification
auto-delete notification of stored pvr content
system resource notification The user preferences 204 include a variety of data such as priority settings 204A (event priority ranking), time of day preferences 204B and day of week preferences 204C, as well as current channel preferences 204D. For example, a viewer may decide that when tuned to certain channels, or when viewing live broadcasts, or when tuned at certain times of the day or week, the pre-defined external events should not interrupt (i.e. not be displayed) viewing activity, or vice-versa. The priority settings 204A might include certain display preferences, such as what color background to use for one pre-defined event or another. It is understood that the depicted user preferences 204 are just some examples of the types of preference data that the viewer may predefine, and is not to be construed as limiting the scope of the claims below.

In one embodiment, the external event ticker 200 further comprises an external event receiver 206 to receive the pre-defined external events 202. The external event receiver 206 insures that the pre-defined external events 202 conform to the standard identification system 130 before passing them on to the external event monitor 208 as described below.

In one embodiment, the external event ticker 200 further comprises an external event monitor 208 to monitor the various sources of potential ticker data based on the standard identification system 130 in conjunction with the pre-defined external events 202 and the user preferences 204. When the monitor detects ticker data that matches the pre-defined external events 202, the ticker data is transmitted to a ticker generator 210 that generates a ticker display 212.

Figure 3:
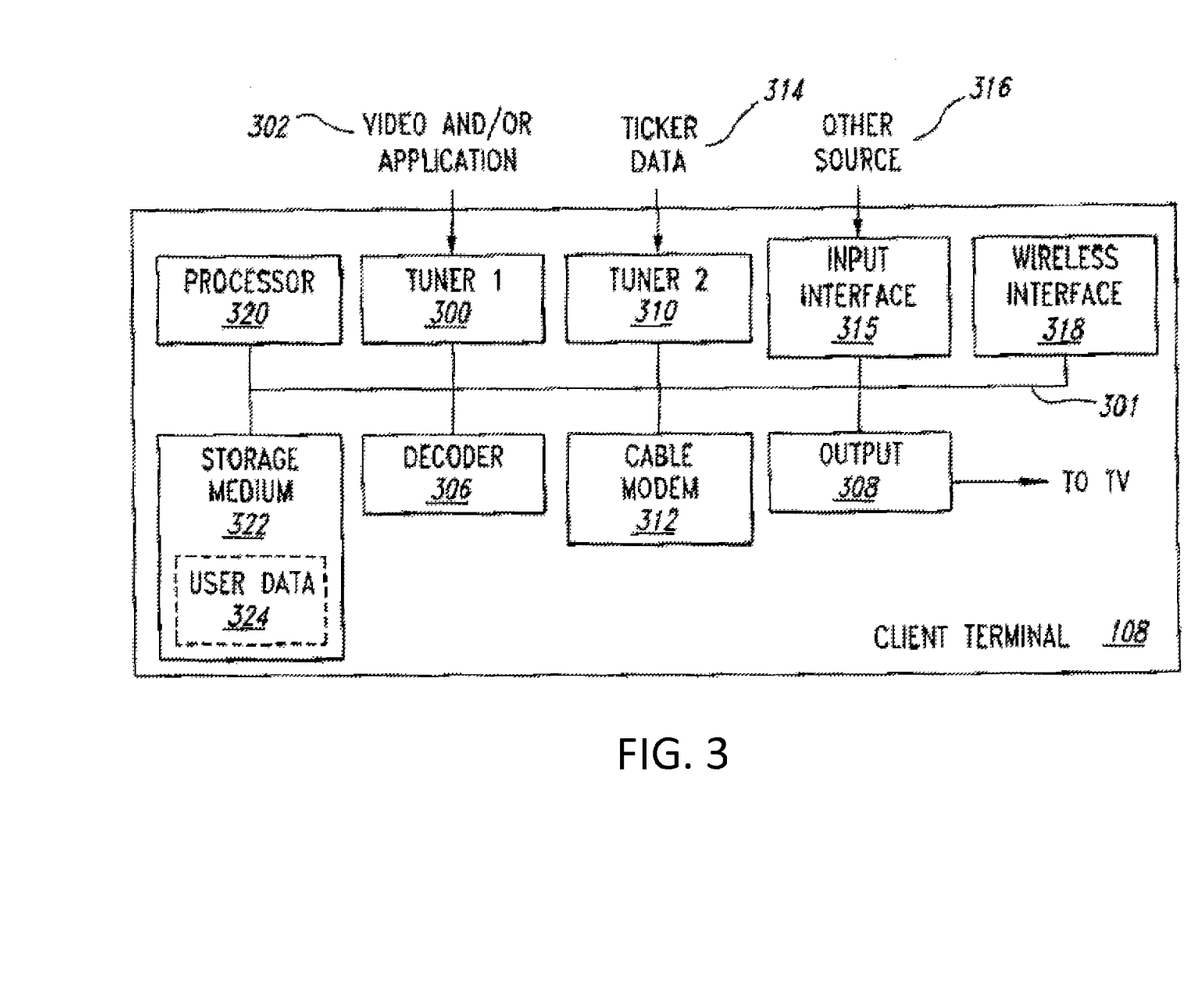
FIG. 3 is a block diagram of an embodiment of a client terminal that can be used in the system of FIGS. 1A-1B to present an external event ticker.

FIG. 3 is a block diagram of an embodiment of a client terminal 108 for the system 100 of FIG. 1A that can implement an embodiment of the invention to present an external event interactive ticker. For the sake of simplicity of illustration and explanation, only the components that are germane to understanding an embodiment of the invention are shown in FIG. 3. It is understood that the embodiment of the client terminal 108 shown in FIG. 3 can have other components different than or in addition to what is shown. Moreover, the various illustrated components may be suitably combined in some embodiments, instead of being separate. It also should be noted that the client terminal 108 is only one embodiment of the invention and that some or all of the components described as embodied in the client terminal 108 can be incorporated into a client television rather than in a separate device. A bus 301 is shown symbolically to depict coupling between the various components.

To briefly describe an embodiment, the client terminal 108 receives ticker data from the ad servers 114, data feeds 112 or other sources 316, either via the H/E 106, or a local home network 124, and then performs the appropriate monitoring and processing of the data to allow data that represent the occurrence of a pre-defined external event to be displayed in a ticker on a display screen of a television set. Although the client terminal 108 is typically an active participant it determining which ticker data to display based on the pre-defined external events 202 and associated user preferences 204, the client terminal 108 can also be passive in that it receives the already monitored ticker data (as well as updates) when the data is monitored and sent by the H/E 106, in accordance with pre-defined external events 202 and associated user preferences 204 previously communicated by client terminal 108 to the H/E 106 (i.e., the H/E may pre-monitor the ticker data prior to sending to client terminals 108). In the more typical case, the client terminal 108 can poll or otherwise explicitly request the data from the H/E 106, including polling the H/E 106 for updated data (i.e., the client terminal 108 "pulls" the data from the H/E 106). In some embodiments, both pre-monitoring and pull mechanisms may be involved.

Once it receives the ticker data from the H/E 106 or other source 316 or home network 124, the data can be buffered or cached (if appropriate), and processed for presentation on the display screen of the television set. In an embodiment, the ticker software, e.g. the ticker generator 210, in the client terminal 108 can work in conjunction with a ticker template or other ticker user interface to display the ticker (and its ticker items) in the appropriate scrolling layout, format, locations, time intervals, topics, content, and so forth. In one embodiment where the ticker data is obtained from the Internet 102, this ticker generator 210 can comprise browser-based software or other software capable to cooperate with a web browser. According to various embodiments, the ticker can be generated and made interactive through Flash, C++, Java, HTML, or other suitable code or software.

The client terminal 108 comprises a first tuner 300 to tune to a Moving Pictures Experts Group (MPEG) stream 302 or other video source. The stream 302 may include video, live transmission, and/or application code, including corresponding text and graphic resources. In an embodiment where tickers are provided in an integrated manner along with the video signal, the ticker can be received by way of the stream 302. One skilled in the art will recognize that there will be a plurality of streams 302, depending on the number of channels and programs that the cable service provider makes available to the client terminal 108.

The first tuner 300 is coupled to a decoder 306 that decodes the video, application, and/or audio into a format that is compatible with a television set coupled to the client terminal 108. The client terminal 108 may include a second tuner 310. The second tuner 310 can work in conjunction with a cable modem 312 to obtain ticker data 314 from the Internet 102, such as via a Data Over Cable Service Interface Specifications (DOCSIS) connection with the distribution server 218. In addition to the ticker data 314, Internet content can also be received by the client terminal 108 by way of the DOCSIS connection through the second tuner 310 and the cable modem 312.

In addition, the client terminal 108 includes or is coupled to an input interface 315, through which other sources 316 of ticker data can be provided to the client terminal 108. An example of the input interface 315 comprises an out-of-band tuner that can be used to tune to ticker data that is provided via an out-of-band channel. In an embodiment, the out-of-band channel(s) can comprise one or more low-bandwidth frequencies carried on the same coaxial cable used to provide the MPEG streams and the Internet content. The out-of-band channel(s) tuned to by the input interface 315 to receive ticker data can be used alternatively or in addition to the DOCSIS channel tuned to by the second tuner 310 in such an embodiment.

Further alternatively or in addition, the input interface 315 can comprise another television broadcast tuner (such as the first tuner 300) to tune to one or more channels that may be carrying ticker data. For example, ticker data (including updates) may be broadcast in one or more channel frequencies specifically dedicated for transmission of such data to client terminals 108. Thus, as an illustration, the first tuner 300 can tune to a channel showing a television program, while the input interface 315 is tuned to receive data (in the form of packets, for example) from a ticker channel to allow a ticker having certain pre-defined external event information to be simultaneously shown on the same television screen as the television program. Of course, even if the ticker data is not broadcast in a dedicated channel, but rather obtained from other sources 316, such as a home network 124, the ticker may also be simultaneously shown on the same television screen as the television program to which the first tuner 300 is tuned by superimposing such ticker onto the television screen.

Yet another example of the input interface 315 is an interface to receive outputs of recording devices such as a PVR or a digital video recorder (DVR) that may have ticker data, such as status information related to those devices (e.g. disk full alerts), or other ticker data which may have been previously received via download. Alternatively or in addition, the input interface 315 can comprise a communication interface, such as an Ethernet connection, a digital subscriber line modem, a wireless communication interface, and so forth, which can provide a link to the H/E 106 to receive ticker data and advertisements originating from data feeds 112 and ad server 114.

An embodiment of the client terminal 108 includes a processor 320 to control operation of the various components shown in FIG. 3. The processor 320 may work in conjunction with ticker software or other machine-readable instructions stored on at least one machine-readable storage medium 322. Such ticker software as the external event monitor 208 and the ticker generator 210 may cooperate with the processor 320 to present ticker data satisfying the pre-defined external events 202 in a ticker template or other screen interface or user interface, configure the format and layout of the ticker in accordance with the user preferences 204, display the ticker data on the display screen of the television, select and insert the pre-defined external event information into a ticker, including data related to the pre-defined event, process received user commands related to interaction with the ticker, and other operations. In an embodiment, the ticker software, such as the external event monitor 208 and ticker generator 210, can be pre-installed in the client terminal 108. In another embodiment, the ticker software 206/208 may be installed by way of download from the system 100.

An audio and video output subsection 308 of the client terminal 108 receives decoded video and/or other applications (including ticker templates and the ticker data presented therein), and provides the decoded information to a television set. A wireless interface 318 operates to receive commands from a user input device (such as a wireless remote control). In an embodiment, such commands can include user commands to interact with an external event ticker. The wireless interface 318 provides these commands to the processor 320 so that the processor 320 can cooperate with the ticker software to perform the corresponding operation.

In an embodiment of the invention, the storage medium 322 can also store user data 324 related to operation of the ticker. For instance, the user data 324 can include various user configuration settings related to the external event ticker, including the pre-defined external events 202 and the user preferences 204. In any of these storage locations, multiple sets of user data 324 may be stored, such as in implementations where multiple users in a household log into a same client terminal 108.

The storage medium 322 can include cache(s), buffer(s), or other types of storage locations where ticker data or other information may be stored. For example, received sports scores can be stored in the storage medium and retrieved during the appropriate times during the course of the scrolling of the ticker. The ticker data stored in the storage medium 322 can be replaced as updates are received from the distribution server 218. In one embodiment, less time-dependent ticker information (e.g., information that need not necessarily be updated several times per day), including graphics for weather displays, game schedules, some types of advertisements, and the like, can be downloaded to the storage medium 322 during non-peak television viewing periods (such as late at night), and then retrieved from the storage medium 322 when that piece of information is appropriate for presentation in the ticker.

Figure 4:
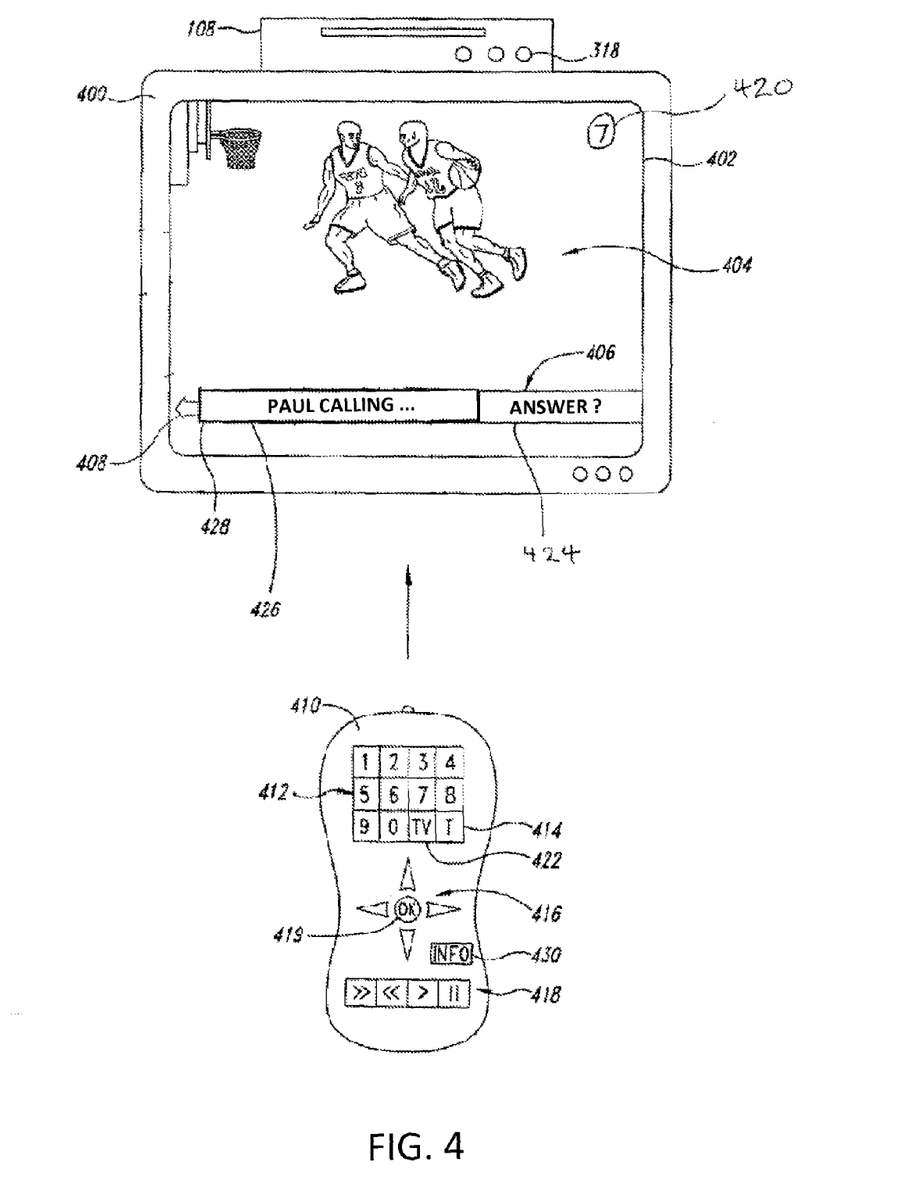
FIG. 4 is an example screen display in conjunction with a remote control depicting an external event ticker in accordance with one embodiment of the invention.
Figure 5:
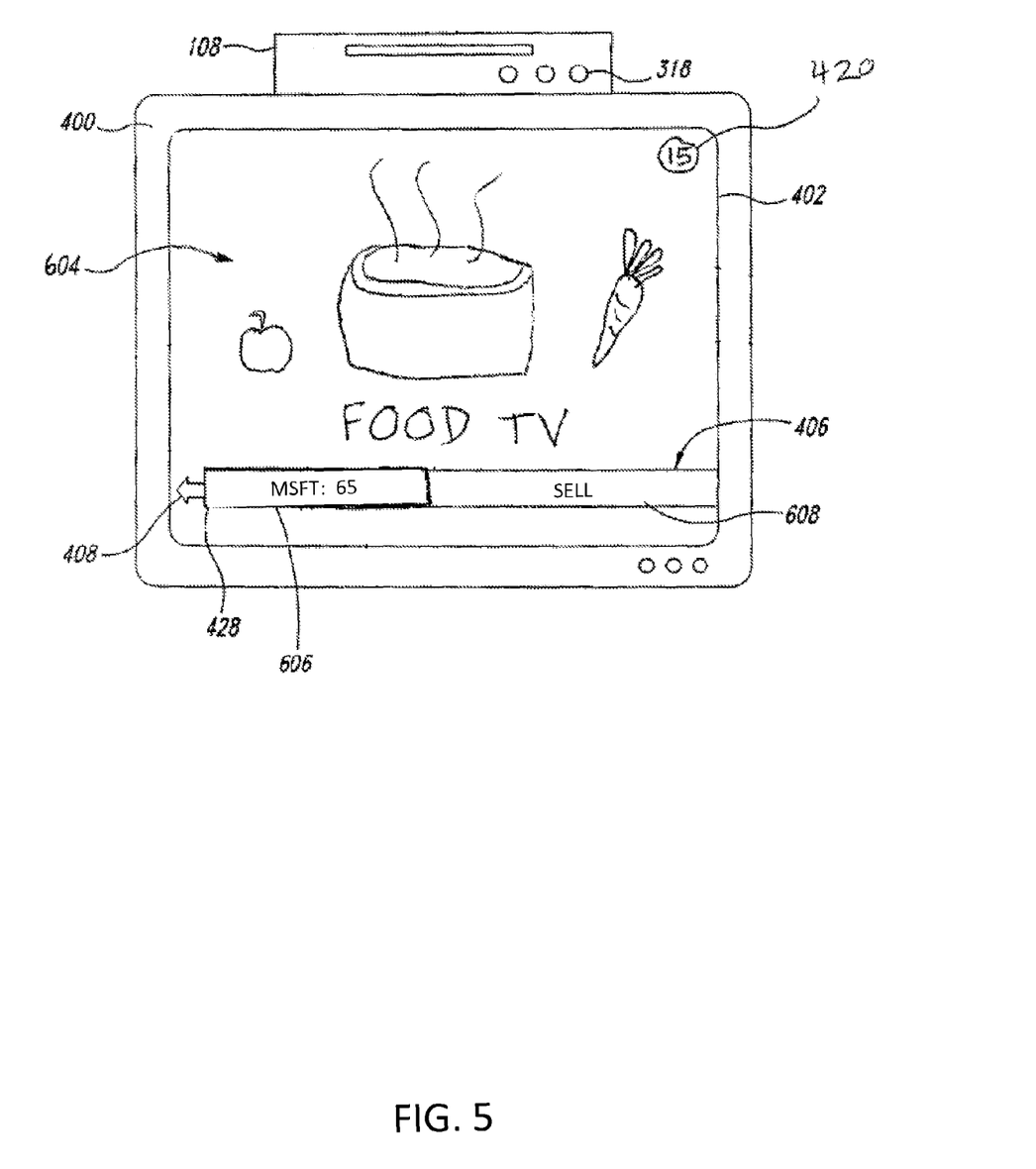
FIG. 5 is an additional example screen display depicting an external event ticker in accordance with one embodiment of the invention.

FIGS. 4-5 are television screen shots depicting operation of an external event interactive ticker or other similar interactive scrollable display in accordance with various embodiments of the invention. For simplicity of explanation, not all of the possible types of pre-defined external events and related ticker operations are shown or described, as such other possible information can be ascertained by examination of the features specifically shown in FIGS. 4-5. Moreover, it is to be appreciated that the format, layout, direction, content, and other characteristics of the ticker shown in FIGS. 4-5 are merely illustrative and that variations are possible.

In FIG. 4, a television set 400 is coupled to the client terminal 108 in a manner that allows a display screen 402 of the television set to show a television program 404. The television program 404 in this example is a basketball game, and it is understood that the television program 404 can include other types of video programs (including a television commercial). A channel indicator 420 indicates that the current channel is "Channel 7." A ticker 406 is shown scrolling across the bottom of the display screen 402. The ticker 406 can be in a screen interface that overlays the television program 404, or the television program 404 may be scaled appropriately on the display screen 402 to fit the screen interface for the ticker 406 and thereby avoid the need for an overlay.

In the example of the ticker 406, the ticker 406 is scrolling from right to left (as symbolically depicted by an arrow 408). It is to be appreciated that in other embodiments, the ticker 406 may be scrolling in different directions and may also be positioned differently on the display screen 402. A navigation control 428, such as a stationary center focus box into which scroll ticker items or a movable selection rectangle that can be moved within the scroll region of the ticker, can be used to make selections of items presented in the ticker 406.

A wireless remote control 410 is in communication with the client terminal 108 (via the wireless interface 318) to perform conventional television-viewing operations and also to control operation of the ticker 406 according to an embodiment of the invention, including viewer interaction involving selection of ticker items. The remote control 410 includes an alphanumeric keypad 412 and buttons 418 that are similar to play, rewind, fast forward, pause, etc. buttons. In an embodiment, the remote control 410 can include a ticker button 414, which if pressed, causes a command to be sent to the client terminal 108 to instruct the ticker software to render the ticker 406 on the display screen 402. If the ticker button 414 is pressed again, the ticker 406 is taken off the display screen 402. Alternatively or in addition, a TV button 422 can be pressed to dismiss the ticker 406.

In one embodiment, selection of items presented by the ticker 406 may be performed via arrow keys 416 that are used to control movement of the navigation control 428 (if it is a movable selection rectangle), followed by pressing an OK button 419 or an INFO button 430. In embodiments where the navigational control 428 is a stationary center focus box, the OK button 419 or the INFO button 430 can be pressed when the desired item scrolls into the center focus box.

FIG. 4 illustrates one embodiment of the invention where at least one item 426 presented by the ticker 406 has satisfied a pre-defined external event, namely a telephone call 202E. More specifically, assuming that the pre-defined external event 202E has been defined such that telephone calls having Paul as the caller (as derived from the caller id associated with the call) should be displayed in the ticker 406. As illustrated, the item 426 is presented by the ticker 406 along with another item 424, which represents a related interactive link that may be provided to allow the viewer to act on the ticker data by clicking on the item 424 display, in this case ANSWER. For example, in one embodiment, selecting ANSWER can cause certain actions to take place within the STB 108 to cause the currently viewed program on screen 404 to pause or mute while the viewer uses the remote 410 to answer the incoming call from Paul. The items 426 and 424 can be presented within the scroll region of the ticker 406 in bold, in a different color (which may indicate a hyperlink or other link), accompanied with an icon, underlined, or via some other technique to alert the viewer that he can interact with the item 424 to initiate the return call or to answer the incoming call. The color or icon or other graphical features may be implemented in accordance with the user preferences 204 defined for the telephone call pre-defined event 202E.

When the item 426 scrolls into the center focus box 428, the viewer can then press the INFO button 430 or the OK button 419 on the remote control 410 so as to view additional details of the item 428, such as the full name of the caller or the calling number. In one embodiment, responding to or otherwise interacting with the item 426 in this manner results in presentation of related additional item(s) 424 within the scroll region of the ticker 406 itself, or presented in other ways (such as in a pop-up window) on the display screen 402. The additional information 424 may be provided via a hyperlink or other link (which may include channel tuning), retrieval of content from storage locations, provided in a manner similar to providing other ticker items, or other suitable technique that would be familiar to those skilled in the art having the benefit of this disclosure.

In one embodiment, the event data that might meet the pre-defined event criteria in pre-defined external event data 202 may be provided by using Advanced Television Enhancement Forum (ATVEF) triggers or other triggering mechanisms to supply the available event data. For instance, identification (ID) information or other information associated with the event data that the event monitor 208 needs to correspond the event data with the pre-defined external events can be placed in the vertical blanking interval (VBI) of signal the television program 404 in a manner that identifies the teams in the game, the type of sport, the location of the game, time of the game, the player(s) in particular video frames, the identity of a caller, the identity and value of a stock, and so forth. Such ID information can be extracted and processed, based on techniques familiar to those skilled in the art having the benefit of this disclosure, to identify and select ticker items, correlated to the same (or similar) ID information and satisfying the pre-defined external events 202, to present in the ticker 406. In the example of FIG. 4, triggers from the signal of the television program 404 have been processed by software to select the item 426 (a telephone call item) relating to a pre-defined external event, a telephone call 202E from a particular caller.

Other techniques may be used to monitor the event data for inclusion into the ticker 406. For instance, as noted earlier, the ticker data may be pre-monitored at the H/E 106 to push only those items of ticker data that have the potential to satisfy the pre-defined external events 202 in client terminal 108.

FIG. 5 illustrates an example when the currently viewed television program 404 (the food channel) is overlaid with a ticker showing certain stock data satisfying a pre-defined external event 202, such as a stock value 202B. As shown in FIG. 5, the ticker 406 displays that the stock symbol MSFT 428 has reached a value of 65, i.e. the pre-defined stock value 202B for stock symbol MSFT 428, causing it to be selected for display on the ticker 406. In addition, the ticker includes related hyperlink data 424, in this case a "SELL" hyperlink, which when clicked will cause the client terminal 108 to switch to an internet display of the viewer's broker home page, so that the viewer can arrange a sale of the stock.

Figure 6:
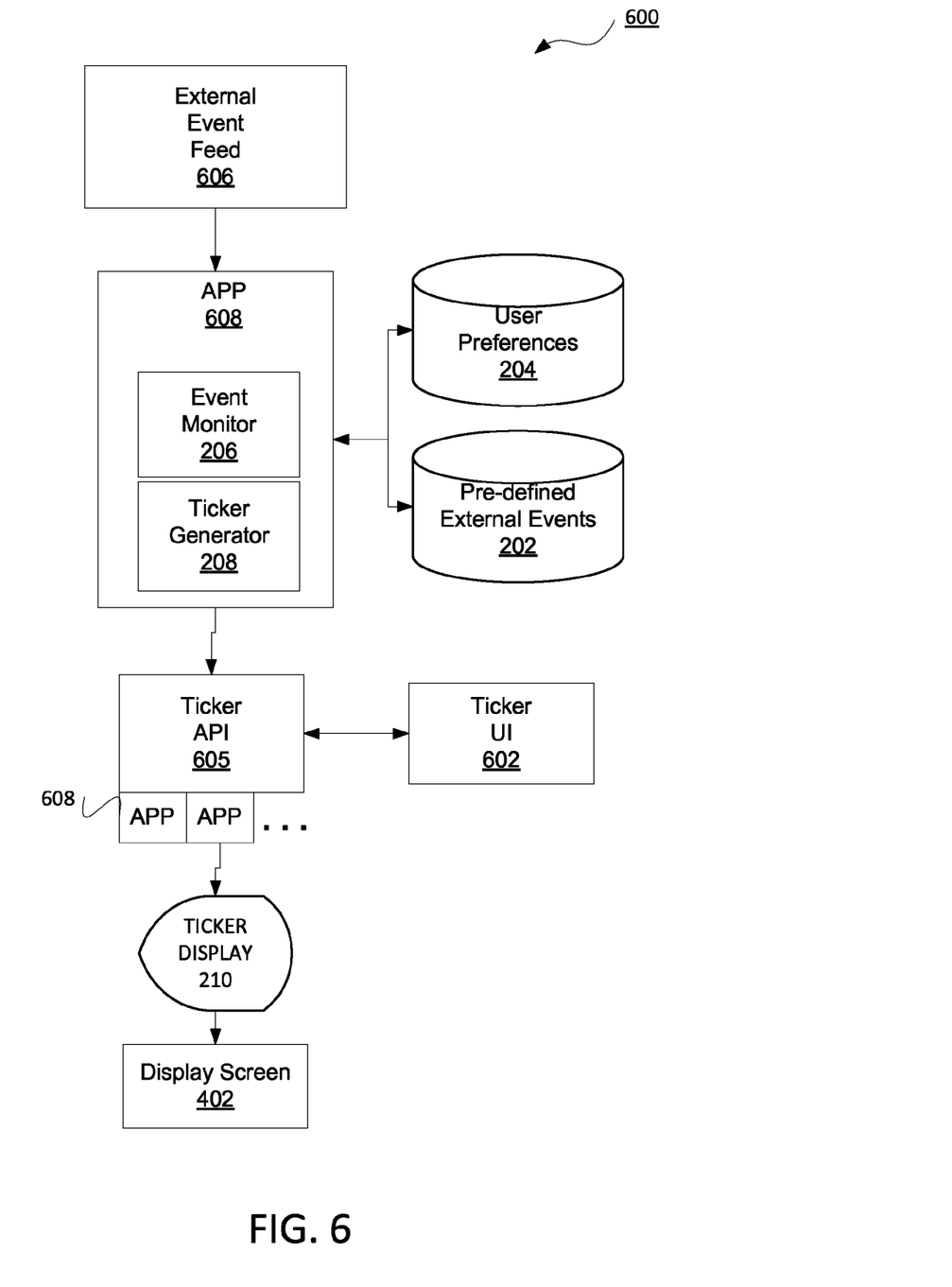
FIG. 6 is a block diagram illustrating the interaction between selected components of the system in FIGS. 1A-1B and the external event ticker of FIG. 2 to present external event ticker displays according to an embodiment of the invention.

FIG. 6 is a block diagram 600 illustrating components that can interact to present pre-defined external event items in the ticker 406 according to an embodiment of the invention. At least some of the components of FIG. 6 can be embodied in software or other machine-readable instruction stored on a machine-readable medium, such as the storage medium 322. An embodiment of the ticker software includes an event monitor 208 that monitors the ticker data as it becomes available in accordance with the pre-defined external event data 202 previously defined by the viewer, and a ticker generator 210 that prepares the selected items for display on the ticker in accordance with the user preference data 204, also previously defined by the viewer. Together, the event receiver 206, event monitor 208 and ticker generator 210 constitute an application, APP 608 that operates in conjunction with a ticker user interface (UI) 602 that presents the ticker 406 on the display screen 402, as well as being able to receive and process viewer responses. A ticker application program interface (API) 605 interacts with the ticker UI 602 to control what the ticker UI displays, how to display, when to display, and so forth in accordance with the ticker generator 210 and user preferences 204. In an embodiment, the ticker API 605 provides items related to the pre-defined event, e.g. item 424, to the ticker UI 602, as well as processing user commands that interact with the presented items (if necessary) and that are entered via the ticker UI 602.

The ticker API 605 interfaces with a plurality of applications 608. In embodiments of the ticker 406 where content is organized according to certain pre-defined event categories, these applications can include a sports application, news application, weather application, or other applications associated with the pre-defined event categories. A external event feed 606 (or other software controller) operates to determine when new or updated ticker information is present and needs to be provided to the APP 608 and ticker API 605.

To generally describe operation of the ticker 406 in one example embodiment, the ticker API 605 logs and knows what the ticker 406 is displaying, and also knows how often the displayed information needs to be refreshed (based on the pre-defined event data 202 and other user preference data 204). In an embodiment, there may be rules in the ticker UI level that define when at least some of the pre-defined event items are to be presented in accordance with user preference data 204. For example, there may be viewer-configurable rules in the form of user preference data 204 that specify that the ticker 406 should not present pre-defined events when certain channels or programs are being displayed on display screen 402, or during certain time periods. If a pre-defined event is detected by the event monitor 208, the ticker API 605 (acting as a container of data) calls a load function that will cause the external event feed 606 to loop through the applications 608 to process the pre-defined event data and pass the event data and any related event data from the application(s) 608 to the ticker API 605 so that the ticker API 605 can pass the event data to the ticker UI 602 for display on ticker display 212, and ultimately on display screen 402.

In an alternative embodiment, the ticker API 605 manages the information that the ticker UI 602 will display, but it does not have knowledge of what the ticker UI 602 displays and when it is displayed. The ticker UI 602 invokes the lower level components, such as the event monitor 208 and the ticker generator 210.

It is appreciated that the ticker content need not necessarily be tagged explicitly with Ids for the event monitor to determine whether a pre-determined external event has occurred. For example, a lookup table can be provided that correlates ticker content event data (that do not have IDs to pre-defined event subject matter IDs. The application 608, after obtaining the IDs for the pre-defined external event data, consults this lookup table to determine whether the corresponding event data (such as the telephone call from Paul) matches the pre-defined external events 202. Once the application 608 determines that the ticker data satisfies the pre-defined external event data, the application 608 notifies the ticker API 605, which then obtains any related ticker content in a manner described in the preceding paragraphs.

Figure 7:
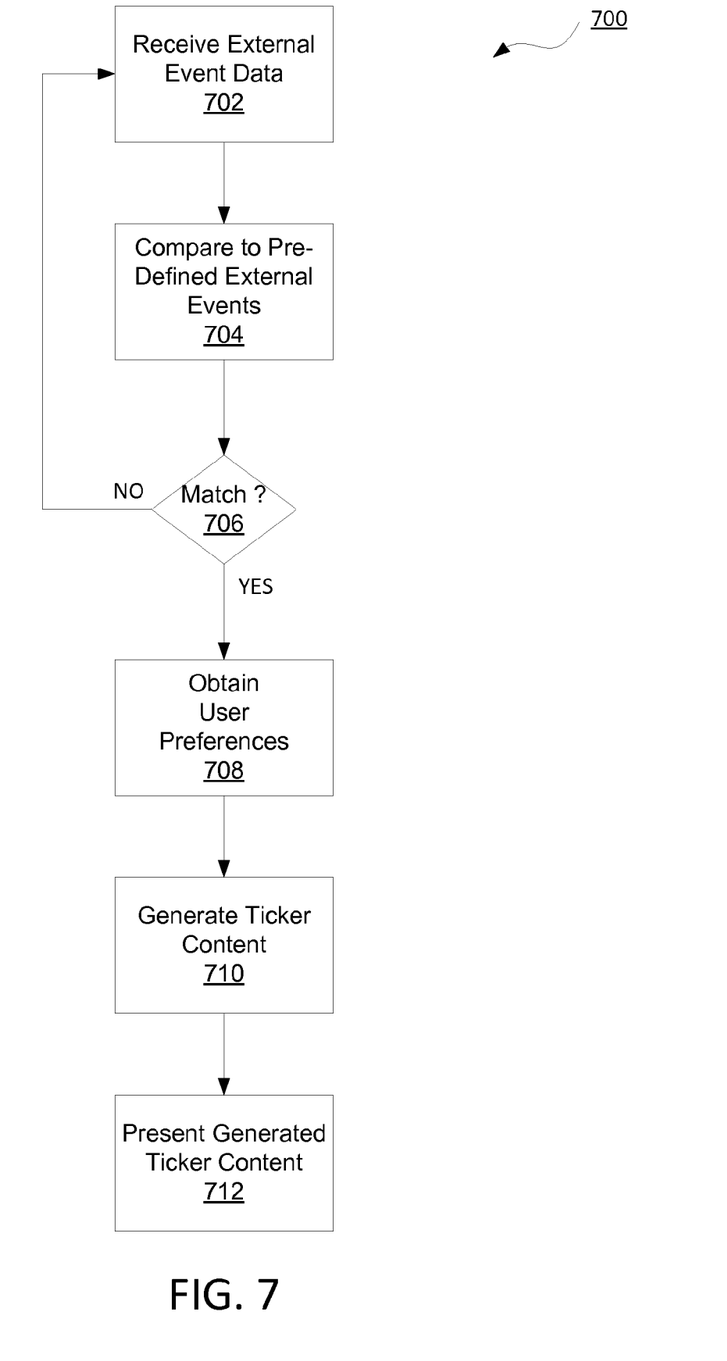
FIG. 7 is a flowchart illustrating operation of a external event ticker according to an embodiment of the invention.

FIG. 7 is a flowchart 700 illustrating the creation of the external event ticker 406 according to an embodiment of the invention. Elements of the flowchart 700 may be embodied in software or other machine-readable instruction stored on a machine-readable medium, such as the storage medium 322. Moreover, operations shown in the flowchart 700 need not necessarily occur in the exact order shown.

At a block 702, a the external event data is received, such as in the television signal that provides the television programs 404 for presentation on the display screen 402. The event monitor 208 monitors the event data to determine whether the event data satisfies the viewer-defined pre-defined event data 202. When there is a match at 706, then the event monitor 208 passes the event data to the ticker generator 210 to obtain any user preferences 204 associated with the particular pre-defined event 202.

At a block 710, the ticker generator 210 generates the ticker content based on the user preferences 204. At process block 712, the ticker generator presents the generated ticker content, i.e. the ticker display 212, to the ticker UI 602 via the ticker API 605 for presentation on display screen 402.

The above description of illustrated embodiments of the invention, including what is described in the Abstract, is not intended to be exhaustive or to limit the invention to the precise forms disclosed. While specific embodiments of, and examples are described herein for illustrative purposes, various equivalent modifications are possible within the scope of the claims that follow.

As an example, a satellite television (TV) delivery system may be implemented alternatively or in addition to a cable distribution system. A satellite TV delivery system may comprise a direct broadcast satellite (DBS) system. A DBS system may comprise a small 18-inch satellite dish (which is an antenna for receiving a satellite broadcast signal); a digital integrated receiver/decoder (IRD), which separates each channel, and decompresses and translates the digital signal so a television can show it; and a remote control. Programming for a DBS system may be distributed, for example, by multiple high-power satellites in geosynchronous orbit, each with multiple transponders. Compression (e.g., MPEG) is used to increase the amount of programming that can be transmitted in the available bandwidth.

A digital broadcast center (e.g., analogous to the head-end 106) may be used to gather programming content, ensure its digital quality, and transmit the signal up to the satellites. Programming may come to the broadcast center from content providers (TBS™, HBO™, CNN™, ESPN™, etc.) via satellite, fiber optic cable, and/or special digital tape. Satellite-delivered programming is typically immediately digitized, encrypted and uplinked to the orbiting satellites. The satellites retransmit the signal back down to every earth-station—or, in other words, every compatible DBS system receiver dish at customers' homes and businesses.

These and other modifications can be made to the invention in light of the above detailed description. The terms used in the following claims should not be construed to limit the claimed subject matter to the specific embodiments disclosed in the specification and the claims. Rather, the scope of the claimed subject matter is to be determined entirely by the following claims, which are to be construed in accordance with established doctrines of claim interpretation.

What is claimed is:

1. A method for presenting an interactive ticker, the method comprising:
    receiving at a given client device a user preference for a pre-defined event, the user preference indicating when to display ticker content for the pre-defined event on the client device, wherein the client device comprises a mobile device;
    transmitting the received user preference to a distribution center that provides video content to a plurality of client devices, including the given client device;
    receiving a video signal and presenting a video program provided by the received signal on a display screen;
    receiving ticker content from the distribution center, wherein the ticker content is generated by the distribution center monitoring event data to determine whether a pre-defined event has occurred and, upon determining that the pre-defined event has occurred, comparing the event data to the user preference to determine whether the event data satisfies the user preference;
    identifying a viewing activity occurring on the given client device;
    determining at the given client device whether to display the received ticker content based on the user preference and the identified viewing activity; and
    providing an interactive ticker on the display screen having presented therein a first item that represents the ticker content for the pre-defined event when it is determined by both the distribution center and the given client device that the ticker content is to be displayed, wherein the interactive ticker is displayed without respect to the determination of whether to display the first item within the interactive ticker.

2. The method of claim 1, wherein the event data monitored by the distribution center comprises at least one of a sports score, a stock value, a security breach, an emergency alert, a telephone call, and a purchase opportunity.

3. The method of claim 1, wherein the client device comprises a cellular phone.

4. The method of claim 1, wherein the related data comprises an interactive link corresponding to an action related to occurrence of the pre-defined event.

5. The method of claim 1, further comprising in response to user interaction with the interactive ticker to select the first item, presenting additional information related to the selected item on the display screen.

6. The method of claim 1, wherein monitoring the event data comprises identifying a subject matter of the event from an identifier associated with the subject matter.

7. A system for displaying an interactive event ticker, comprising:
- a video display to display video content, including a video program;
- a user preference subsystem to receive a user preference for a pre-defined event and to transmit the user preference to a distribution center, the user preference indicating when to display ticker content for the pre-defined event;
- a ticker generator on a client device, the ticker generator being operable to identify a viewing activity occurring on the video display, and to automatically generate an interactive ticker on the video display using ticker content received from the distribution center, wherein the ticker content is sent from the distribution center upon the distribution center monitoring event data and determining that a pre-defined event has occurred and comparing the event data to the user preference transmitted to the distribution center to determine whether the event data satisfies the user preference, and wherein the ticker generator is configured to determine whether to display the generated interactive ticker based on the identified viewing activity occurring on the video display and the user preference, wherein the client device comprises a mobile device; and
- wherein a first item is displayed within the interactive ticker that represents the ticker content for the pre-defined event when it is determined by both the distribution center and the given client device that the ticker content represented by the first item is to be displayed, the interactive ticker being displayed without respect to the determination of whether to display the first item within the interactive ticker.

8. The apparatus of claim 7, wherein the distribution center determining whether a pre-defined event has occurred includes comparing whether the numerical value associated with the received event data matches a pre-defined event numerical value.

9. The apparatus of claim 7, wherein the user preference indicates a time period within which the interactive ticker may be generated.

10. The apparatus of claim 7, wherein the user preference includes a relative priority compared to the identified viewing activity occurring on the video display to indicate whether the current identified viewing activity may be interrupted with the display of the interactive ticker.

11. The apparatus of claim 7, wherein the event data comprises a security breach detected by a security system associated with the apparatus.

12. The apparatus of claim 7, wherein the pre-defined event has occurred when the numerical value associated with the received event data matches the pre-defined event numerical value.

13. The apparatus of claim 7, wherein the interactive ticker further includes any data related to the pre-defined event, and wherein any data related to the event comprises an interactive link corresponding to an action related to the occurrence of the pre-defined event and comparing it to a corresponding pre-defined event value.

14. The apparatus of claim 10, wherein the relative priority of the pre-defined event compared to the identified viewing activity is determined in accordance with a first user preference that indicates a priority associated with the pre-defined event and a second user preference that indicates a priority associated with the identified viewing activity.

15. A system to provide event ticker content, the system comprising:
- a client device comprising a video display to display video content, including a video program, wherein the client device comprises a mobile device;
- an interface to receive from the client device a user preference indicating when to display on the client device ticker content for a pre-defined event; and
- a distribution center, comprising:
  - an interface to receive an event feed,
  - a storage medium for storing pre-defined events and user preferences
  - a processor to monitor the event feed against the pre-defined events and user preferences and to select those events from the event feed that match the pre-defined events, and
  - an interface to provide to the client device, ticker content for an event;
- wherein the client device is configured to identify a viewing activity occurring thereon and, in response to receiving the ticker content from the distribution center that satisfies a pre-defined event and user preferences, to determine based on the user preferences a relative priority of the ticker content compared to the identified viewing activity and to display the ticker content in an interactive ticker when ticker content has a higher priority than the identified viewing activity; and
- wherein a first item is displayed within the interactive ticker that represents the ticker content for the pre-defined event when it is determined by both the distribution center and the given client device that the ticker content represented by the first time is to be displayed, the interactive ticker being displayed without respect to the determination of whether to display the first item within the interactive ticker.

16. The system of claim 15, wherein the user preference includes at least one of a priority, a time of day, a day of week, and a current channel.

17. The system of claim 15, wherein the pre-defined events include a security breach detected by a security system associated with the client device.

18. The system of claim 15, further comprising a standard event identification scheme, wherein the processor is to monitor the event feed against the pre-defined events in accordance with the standard event identification scheme.

19. A non-transitory computer-readable medium including computer program instructions that cause a processor to implement a method, the method comprising:
- receiving a user preference, the user preference indicating when to display ticker content on a first client device associated with the processor, wherein the first client device comprises a mobile device;
- transmitting the received user preference to a distribution center that provides video content to a plurality of client devices, including the first client device;
- receiving ticker content from the distribution center, wherein the ticker content is generated by the distribution center monitoring event data for one or more events that correspond to the user preference, and upon comparing the event data to the user preference to determine whether received ticker content satisfies the user preference;

identifying at the first client device a viewing activity associated with a currently displayed video program;

determining at the first client device whether to display the ticker content received from the distribution center on the display screen based on the user preference and the identified viewing activity; and generating a ticker on the display screen, the interactive ticker including interactive ticker content associated with event data, when it is determined by both the client device and the distribution center that the ticker content is to be displayed;

wherein a ticker is displayed without respect to the determination of whether to display the interactive ticker content based on user preferences.

20. The computer-readable medium of claim 19, wherein the user preference indicates a time period within which the interactive ticker content may be generated.

21. The computer-readable medium of claim 19, wherein the user preference is used to indicate whether the identified viewing activity may be interrupted with the display the ticker.

22. The computer-readable medium of claim 19, wherein the relative priority of an event compared to the identified viewing activity is determined in accordance with a first user preference that indicates a priority associated with the event and a second user preference that indicates a priority associated with the identified viewing activity.

23. The computer-readable medium of claim 19, wherein any data related to the event comprises an interactive link corresponding to an action related to the occurrence of the pre-defined event and comparing it to a corresponding pre-defined event numerical value.

24. A method for providing an interactive ticker, the method comprising:

receiving at a distribution center user preferences for a first client device among a plurality of client devices, wherein the client devices receive video programming from a service operator and wherein the user preferences indicate when to provide ticker content for the first client device, wherein the first client device comprises a mobile device;

storing at the distribution center the received user preferences;

monitoring event data at the distribution center to determine whether to deliver ticker content associated with an event to the client device based on the user preferences;

upon the distribution center determining that the event data satisfies the user preference, providing ticker content corresponding to the event data to the first client device;

wherein the first client device includes an interactive ticker comprising the ticker content corresponding to the event data, wherein the interactive ticker is displayed when the user preference assigns a higher priority to the event data than a priority of a current viewing activity;

wherein a first item is displayed within the interactive ticker that represents the ticker content for the event when it is determined by both the distribution center and the given client device that the ticker content is to be displayed, the interactive ticker being displayed without respect to the determination of whether to display the ticker content associated with the event data within the interactive ticker.

25. The method of claim 24, wherein the ticker content and the video programming are provided to the client device in an integrated manner via the video signal.

\* \* \* \* \*